BALANCING ARRANGEMENT

Filed June 18, 1953

INVENTOR
L. G. ABRAHAM

BY Ralph T. Holcomb
ATTORNEY 2,788,396

BALANCING ARRANGEMENT

Leonard G. Abraham, Albuquerque, N. Mex., assignor to Bell Telephone Laboratories, Incorporated, New York, N. Y., a corporation of New York Application June 18, 1953, Serial No. 362,540

19 Claims. (Cl. 179—170)

This invention relates to wave transmission and more particularly to a balancing arrangement for connecting a transmission line to a biconjugate network.

An object of the invention is to obtain a high return loss on a transmission line connected to a biconjugate network. Another object is to increase the return loss obtainable with irregular transmission lines. A further object is to obtain a high return loss without using a balancing network for the line.

When a transmission line is connected to a biconjugate network as, for example, in a two-wire repeater or a four-wire termination, it is customary to employ a balancing network which will match the impedance of the line. If a high gain is to be obtained from the associated amplifier, the balancing network must be of the precision type in order to ensure a high return loss on the line. Such a precision network is difficult to design and costly to manufacture, especially if it is to balance an irregular line.

In accordance with the present invention, this balancing network is entirely eliminated, or the precision with which it must match the line is greatly reduced, and the effective return loss on the line is increased by using the line impedance to ground on one side to balance the line impedance to ground on the other side. This balance between the two sides of the line is ordinarily very high regardless of irregularities of the line or changes in the line from time to time. A very important practical advantage is that it is not necessary to adjust a balancing network individually for each line. A defect of previous suggestions along this line has been that the phase relations were such that it was impossible to obtain simultaneously good balances and good transmission, both from the line to the amplifier input and from the amplifier output to the line. This is avoided in the present invention by using gyrators which have different phase shifts in the two directions of transmission through them, circuits with different gains in the two directions, or circuits with both different gains and phase shifts in the two directions. Application of the arrangement to two-wire circuits reduces echoes and improves the singing performance, and its use with four-wire terminations permits lower net losses throughout the telephone plant. In addition, the invention permits the use of two-wire repeaters in short toll and local circuits where their general use with present devices is impracticable because of circuit irregularities and changes in impedances caused by switching operations.

The nature of the invention and its various objects, features, and advantages will appear more fully in the following detailed description of typical embodiments illustrated in the accompanying drawing, of which Fig. 1 is a schematic circuit of a balancing arrangement embodying the invention;

Figure 1:
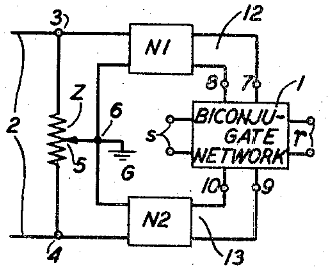

Fig. 1 shows the basic circuit of an arrangement in accordance with the invention comprising a biconjugate network 1 connected through two similar networks N1 and N2 to the two halves of a balanced, two-wire transmission line 2 which is terminated in a shunt impedance Z, preferably a resistance, connected between the terminals 3 and 4. The two halves of the line 2 are obtained by connecting the center 5 of the impedance Z to the terminal 6, which may be grounded as indicated at G. The center tap 5 is adjusted to make the two halves of the line as nearly equal in impedance as possible. The biconjugate network 1 has two pairs of conjugate terminals, 7—8 and 9—10, and two other pairs of conjugate terminals, *r* and *s*. The network N1 is connected between the terminals 3—6 and 7—8, and the network N2 between the terminals 4—6 and 9—10. The sum of the transmission losses in the two directions through the network N1 is approximately equal to the sum of the transmission losses in the two directions through the network N2, and also the sum of the phase shifts in the two directions through N1 is approximately equal to the sum of the phase shifts in the two directions through N2. However, in general, each of the networks N1 and N2 has different transmission losses in the two directions and different phase shifts in the two directions.

These losses and phase shifts are generally selected to provide a high effective return loss on the line 2, or to accomplish other desirable objectives. These desirable objectives depend upon the particular problem and different solutions may be obtained depending upon various factors. For example, the allowable loss from the line 2 to terminals *r* will generally differ from the allowable loss from terminals *s* to the line, and this difference will be greater for a two-wire repeater case than for a four-wire terminal case. Again, when singing is the circuit limitation of importance, the return loss desired is usually a fixed amount and improvements beyond this figure are unnecessary, whereas for echo or ringing limitations considerable margin is usually desirable. Also, the precise value of return loss desired depends upon the application in question. A virtue of the arrangement is that it permits juggling the constants to improve one factor at another's expense.

When these losses and phase shifts in the networks N1 and N2 in the two directions are chosen for optimum performance, the operation of the circuit may be analyzed as follows: If a voltage from some suitable source is applied, say, to the terminals *s* of the biconjugate network 1, a wave passes through the network N1 in the path 12 and, if there are any irregularities in the line 2, a portion of this wave is reflected and returns through the network N1 to the network 1 and appears on the opposite free terminals *r*. In a similar way, a wave passes through the network N2 in the path 13 to the line 2, and the portion reflected by line irregularities returns over the same path to the network 1 where it also appears across the terminals *r*. When the two sides of the line 2 are identical, however irregular they may be in the longitudinal sense, the currents returned over the paths 12 and 13, respectively, will be equal in magnitude. These currents are poled to be 180 degrees out of phase at the terminals *r*, so that they will cancel each other. This poling may require turning over the connection of one of the networks N1 or N2 to the line 2. Even if the line 2 is perfectly regular, an impedance mismatch on the line side of the networks N1 and N2 may cause reflected currents to be returned over the paths 12 and 13 to the terminals *r*. However, these currents will also cancel each other if the irregularity currents cancel.

The impedance of the line 2 bridged across the impedance Z may be considered to be made up of two parallel branches, one constituted by the direct impedance between the terminals 3 and 4 and the other consisting of the impedance between the terminal 3 and ground G in series with the impedance between ground and the terminal 4. When this direct impedance is not infinite, there will also be currents which are transmitted from the terminals *s* over the path 12 to the line 2, return over the path 13, and appear at the terminals *r*. Similarly, there will be currents from the terminals *s* which are transmitted over the path 13 to the line 2 and return to the terminals *r* over the path 12. However, if the losses and phase shifts in the two directions in the networks N1 and N2 are properly chosen, these two components may also be made to cancel each other. This will be accomplished whenever the total losses in the two paths from *s* to *r* just traced are equal, the total phase shifts therein are equal, and the networks N1 and N2 are so poled that the received currents at *r* oppose each other. Obviously, there is an infinite number of combinations of the losses and the phase shifts in both directions through N1 and N2 which will satisfy this condition. Any one of these combinations is satisfactory.

Figure 2:
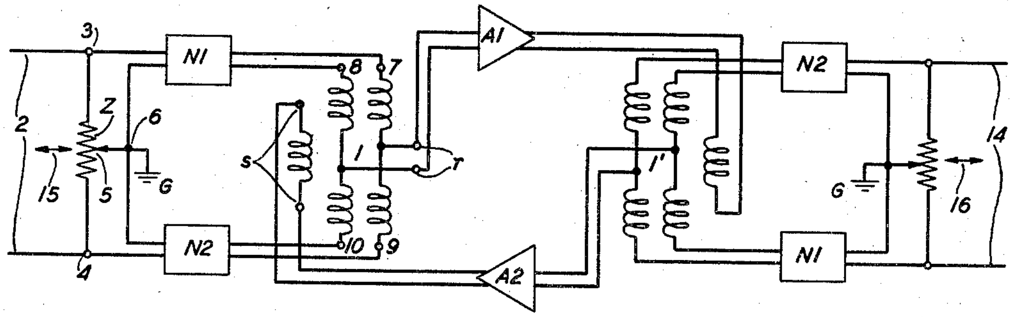
Fig. 2 is a schematic circuit of a two-way, two-amplifier repeater embodying the invention.

Fig. 2 shows two balancing arrangements of the type shown in Fig. 1 connected back-to-back through two amplifiers A1 and A2 to form a two-way repeater connecting the transmission lines 2 and 14. The double-pointed arrows 15 and 16 indicate that transmission may be in either direction. The portion of the circuit to the right of the amplifiers may be a duplicate of the portion to the left. The biconjugate networks 1 and 1′ are shown specifically as balanced hybrid coils, the design of which is well known.

Figure 3:
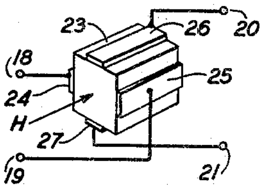
Fig. 3 is a perspective view of one form of gyrator suitable for use as the networks N1 and N2 of Figs. 1 and 2.

Each of the networks N1 and N2 shown in Figs. 1 and 2 may, for example, be a gyrator. Fig. 3 shows a suitable gyrator of the type employing the Hall effect. The device comprises two pairs of terminals, 18—19 and 20—21, a rectangular hexahedron 23 of square cross section composed of a semiconductive material such as silicon or mono-crystalline n-type germanium, and four conductive electrodes 24, 25, 26, and 27 in contact with two pairs of opposite side faces. The electrodes 24, 25, 26, and 27 are alike in size, centrally positioned on the faces, and electrically connected, respectively, to the terminals 18, 19, 20, and 21. The arrow H symbolizes a magnetic field that is substantially uniform over a transverse cross section of the crystal 23 and passes through the crystal in a direction substantially perpendicular to the square end faces. The field is preferably parallel to one of the crystalographic axes of the crystal 23.

When the gyrator of Fig. 3 is used in the circuit of Fig. 1 or Fig. 2 to constitute the network N1, the terminals 18, 19, 20, and 21 may be connected, respectively, to the terminals 3, 6, 7, and 8. A second similar gyrator may be connected in reverse to constitute the network N2, with the terminals 18, 19, 20, and 21 connected, respectively, to the terminals 9, 10, 4, and 6.

Figure 4:
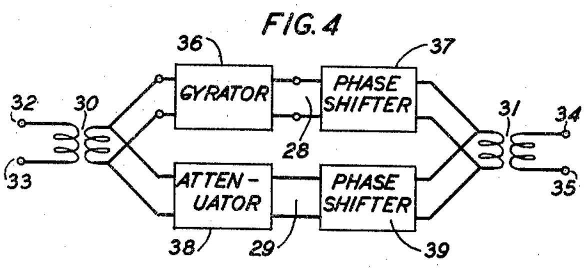
Fig. 4 is a schematic circuit of a more elaborate network, including a gyrator, which may be used for the networks N1 and N2 of Figs. 1 and 2.

Fig. 4 shows a more elaborate circuit which may be used for the networks N1 and N2 of Figs. 1 and 2. It comprises two parallel transmission paths 28 and 29 connected through the transformers 30 and 31 to two pairs of terminals 32—33 and 34—35. Hybrid coils might be substituted for the transformers. The path 28 includes a gyrator 36, which may be of the type shown in Fig. 3, connected in tandem with a phase shifter 37. The path 29 comprises the tandem arrangement of an attenuator 38 and a second phase shifter 39. The attenuator 38 and the phase shifters 37 and 39 may, if desired, be made adjustable. The transmission path 29 serves to reduce the absolute value of the difference between the phase shift in the two directions between the terminals 32—33 and the terminals 34—35. Any difference less than that in the gyrator 36 alone may thus be obtained. Also, changes in differences over the frequency band of interest may be corrected by properly designing the phase shifters 37 and 39. When used as the network N1, the terminals 32, 33, 34, and 35 may be connected, respectively, to the terminals 3, 6, 7, and 8.

Figure 5:
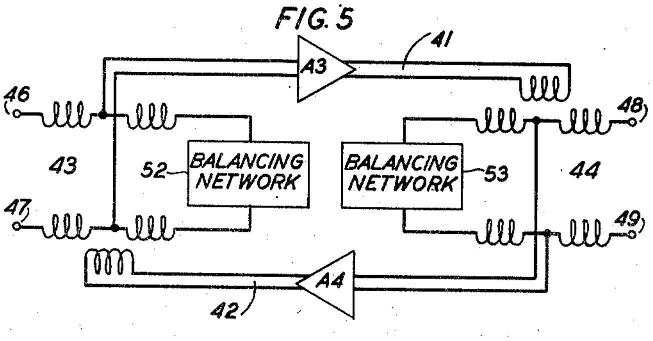
Fig. 5 shows schematically another network, embodying amplifiers, which may be used for the networks N1 and N2 of Figs. 1 and 2.

Fig. 5 shows a circuit similar to a 22-type repeater that may be used for the networks N1 and N2. The circuit comprises two amplifiers A3 and A4 in parallel transmission paths 41 and 42 which are connected through the hybrid coils 43 and 44 to the two pairs of terminals 46—47 and 48—49. Although the circuit includes two balancing networks 52 and 53, these need not be designed to balance their associated transmission lines with the precision usually required in a 22-type repeater. If the network 52 is not a precise match for half of the transmission line 2, currents may be returned even though the line is perfectly regular. However, when two circuits of the type shown in Fig. 5 are used as the networks N1 and N2 in Fig. 1, the gains in the amplifiers A3 and A4 may be adjusted to different values so selected that the currents from them appearing at the terminals *r* cancel each other. For example, echo currents which follow the path from the terminals *s* through N1 to the line 2 and back through N1 to the terminals *r* may be cancelled by echo currents which take a path from *s* through N2 to the line 2 and back through N2 to *r*. Assuming equal phase shifts in N1 and N2, the requirement for complete cancellation is that the sum of the gains in the two directions through N1 be equal to the sum of the gains in the two directions through N2. However, complete cancellation is not necessary when a limited return loss is satisfactory. In that case, a departure of a few decibels from the indicated equality is permissible.

Here, also, an infinite number of combinations of gains will give the desired equality or the permissible amount of inequality. The choice is made on an engineering basis and depends upon the particular application. Primary objectives are (1) to provide sufficient cancellation between echo currents which go out through N1 and return through N2 and echo currents which go out through N2 and come back through N1 and (2) to keep sufficiently small the sum of the transmission loss from the line 2 to the terminals *r* and the loss from the terminals *s* to the line.

Figure 6:
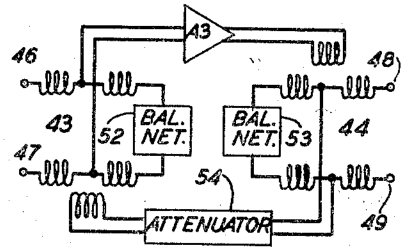
Fig. 6 shows schematically a modified form of the circuit of Fig. 5 in which an attenuator replaces one of the amplifiers.

Fig. 6 shows another circuit, of more limited application, which may be used for the networks N1 and N2. It is identical with the circuit of Fig. 5 except that an economy is effected by replacing the amplifier A4 by an attenuator 54, which may be variable.

Figure 7:
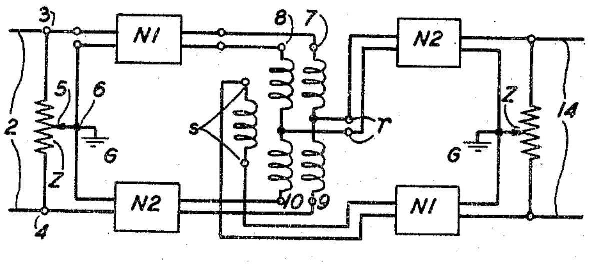
Fig. 7 shows schematically a modified form of the repeater circuit of Fig. 2.

Fig. 7 shows a modified form of the 22-type repeater shown in Fig. 2. The amplifiers A1 and A2, and also the hybrid coil 1′, have been eliminated and the right-hand networks N1 and N2 connected, respectively, directly to the pairs of terminals *s* and *r* of the hybrid coil 1. In this case the networks N1 and N2 will ordinarily comprise amplifiers and may, for example, be of the type shown in Fig. 5 or Fig. 6.

It is to be understood that the above-described arrangements are illustrative of the application of the principles of the invention. Numerous other arrangements may be devised by those skilled in the art without departing from the spirit and scope of the invention.

What is claimed is:

1. In combination, a balanced two-wire transmission line, means comprising a terminating shunt impedance with center tap for dividing said line into two halves substantially equal in impedance, a biconjugate network having two pairs of conjugate terminals, a first transmission network connected between one pair of said terminals and one half of said line, and a second transmission network connected between the other pair of said terminals and the other half of said line, the sum of the transmission losses in the two directions through said first transmission network being approximately equal to the sum of the transmission losses in the two directions through said second transmission network, the sum of the phase shifts in the two directions through said first transmission network being approximately equal to the sum of the phase shifts in the two directions through said second transmission network, and each of said transmission networks having different transmission losses in the two directions so selected as to provide a high effective return loss on said line.

2. The combination in accordance with claim 1 in which at least one of said transmission networks comprises a gyrator connected between the input and the output terminals thereof.

3. The combination in accordance with claim 1 in which each of said transmission networks comprises a gyrator connected between the input and the output terminals thereof, the connection of one of said gyrators being reversed with respect to the connection of the other of said gyrators.

4. The combination in accordance with claim 3 in which the connection of one of said gyrators is reversed with respect to the connection of the other of said gyrators.

5. The combination in accordance with claim 1 in which one of said transmission networks comprises a gyrator and a phase shifter connected in tandem.

6. The combination in accordance with claim 1 in which one of said transmission networks comprises a gyrator and a phase shifter connected in parallel.

7. The combination in accordance with claim 1 in which one of said transmission networks comprises two parallel transmission paths, one of said paths comprising a gyrator and a phase shifter connected in tandem and the other of said paths comprising a second phase shifter.

8. The combination in accordance with claim 7 in which said other path comprises an attenuator connected in tandem with said second phase shifter.

9. The combination in accordance with claim 1 in which one of said transmission networks comprises two parallel transmission paths, each of said paths comprising an amplifier and said amplifiers having different directions of amplification.

10. The combination in accordance with claim 9 in which said amplifiers differ in gain.

11. The combination in accordance with claim 1 in which one of said transmission networks comprises two parallel transmission paths, one only of said paths comprising an amplifiers and the other of said paths comprising an attenuator.

12. The combination in accordance with claim 1 in which each of said transmission networks has different phase shifts in the two directions.

13. The combination in accordance with claim 1 in which said center tap is grounded.

14. A two-way repeater comprising two combinations in accordance with claim 1 arranged back-to-back with said biconjugate networks facing each other, two parallel transmission paths interconnecting said biconjugate networks, and two amplifiers, said amplifiers being connected, respectively, in said paths and having different directions of amplification.

15. In combination, a balanced two-wire transmission line, means comprising a terminating shunt impedance with center tap for dividing said line into two halves substantially equal in impedance, a biconjugate network having two pairs of conjugate terminals, a first transmission network connected between one pair of said terminals and one half of said line, and a second transmission network connected between the other pair of said terminals and the other half of said line, the sum of the transmission losses in the two directions through said first transmission network being approximately equal to the sum of the transmission losses in two directions through said second transmission network, the sum of the phase shifts in the two directions through said first transmission network being approximately equal to the sum of the phase shifts in the two directions through said second transmission network, and each of said transmission networks having different phase shifts in the two directions so selected as to provide a high effective return loss on said line.

16. The combination in accordance with claim 15 in which at least one of said transmission networks comprises a gyrator connected between the input and the output terminals thereof.

17. The combination in accordance with claim 15 in which each of said transmission networks comprises a gyrator connected between the input and the output terminals thereof, the connection of one of said gyrators being reversed with respect to the connection of the other of said gyrators.

18. The combination in accordance with claim 15 in which one of said transmission networks comprises two parallel transmission paths, each of said paths comprising an amplifier and said amplifiers having different directions of amplification.

19. A two-way repeater comprising two combinations in accordance with claim 15 arranged back-to-back with said biconjugate networks facing each other, two parallel transmission paths interconnecting said biconjugate networks, and two amplifiers, said amplifiers being connected, respectively, in said paths and having different directions of amplification.

References Cited in the file of this patent

UNITED STATES PATENTS

| | | |
|---|---|---|
| 1,973,504 | Pierrot | Sept. 11, 1934 |
| 2,647,239 | Tellegen | July 28, 1953 |